United States Patent
Jin

(10) Patent No.: US 10,235,300 B2
(45) Date of Patent: Mar. 19, 2019

(54) MEMORY SYSTEM INCLUDING MEMORY DEVICE AND OPERATION METHOD THEREOF

(71) Applicant: SK hynix Inc., Gyeonggi-do (KR)

(72) Inventor: Young-Jae Jin, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 75 days.

(21) Appl. No.: 15/236,200

(22) Filed: Aug. 12, 2016

(65) Prior Publication Data
US 2017/0270050 A1 Sep. 21, 2017

(30) Foreign Application Priority Data
Mar. 17, 2016 (KR) .................. 10-2016-0031970

(51) Int. Cl.
G06F 3/06 (2006.01)
G06F 12/10 (2016.01)

(52) U.S. Cl.
CPC ............ *G06F 12/10* (2013.01); *G06F 3/061* (2013.01); *G06F 3/0613* (2013.01); *G06F 3/0649* (2013.01); *G06F 3/0655* (2013.01); *G06F 3/0683* (2013.01); *G06F 3/0685* (2013.01); *G06F 2212/65* (2013.01)

(58) Field of Classification Search
USPC ........................................................ 711/202
See application file for complete search history.

(56) References Cited

U.S. PATENT DOCUMENTS

| | | | |
|---|---|---|---|
| 8,397,013 B1 | 3/2013 | Rosenband et al. | |
| 2004/0030957 A1* | 2/2004 | Yadavalli ............. | G06F 11/073 714/30 |
| 2005/0162899 A1* | 7/2005 | Yamagami ............ | G06F 3/0601 365/158 |
| 2005/0262323 A1* | 11/2005 | Woo ....................... | G06F 13/161 711/167 |
| 2010/0157697 A1* | 6/2010 | Sato ........................ | G11C 5/147 365/189.11 |
| 2011/0202578 A1* | 8/2011 | Asano .................. | G06F 12/0246 707/813 |
| 2011/0225388 A1* | 9/2011 | Oh ....................... | G06F 12/1009 711/206 |
| 2012/0151127 A1* | 6/2012 | Lim ..................... | G06F 12/0246 711/103 |
| 2012/0254581 A1* | 10/2012 | Kim ..................... | G11C 11/5621 711/203 |
| 2013/0080689 A1* | 3/2013 | Jo ........................ | G06F 12/0246 711/103 |
| 2013/0097369 A1* | 4/2013 | Talagala .............. | G06F 12/0246 711/103 |
| 2013/0170296 A1* | 7/2013 | Yun ........................ | G11C 16/06 365/185.09 |
| 2013/0250686 A1* | 9/2013 | Marukame ............. | G11C 16/08 365/185.12 |

(Continued)

*Primary Examiner* — Mano Padmanabhan
*Assistant Examiner* — Jean C Edouard
(74) *Attorney, Agent, or Firm* — IP & T Group LLP

(57) ABSTRACT

A memory system includes first and second memory devices having at least one different characteristic from each other and a controller suitable for configuring an address map of data stored in the first and the second memory devices, checking access frequency of the stored data, and updating the address map based on a result of the checking.

20 Claims, 6 Drawing Sheets

(56) References Cited

U.S. PATENT DOCUMENTS

| | | | | |
|---|---|---|---|---|
| 2013/0262751 A1* | 10/2013 | Kwak | ............... | G06F 12/0246 |
| | | | | 711/103 |
| 2014/0082323 A1* | 3/2014 | Li | ............... | G06F 12/0246 |
| | | | | 711/207 |
| 2014/0136752 A1* | 5/2014 | Terada | ............... | G06F 12/0246 |
| | | | | 711/102 |
| 2014/0173234 A1* | 6/2014 | Jung | ............... | G06F 3/0688 |
| | | | | 711/162 |
| 2014/0192583 A1* | 7/2014 | Rajan | ............... | G11C 7/10 |
| | | | | 365/63 |
| 2014/0281361 A1* | 9/2014 | Park | ............... | G06F 3/0641 |
| | | | | 711/206 |
| 2015/0052290 A1* | 2/2015 | Um | ............... | G06F 3/0679 |
| | | | | 711/103 |
| 2015/0052291 A1* | 2/2015 | Shibata | ............... | G06F 12/0246 |
| | | | | 711/103 |

* cited by examiner

FIG. 4A

| Valid Bit | Access Score | LA | PA |
|---|---|---|---|
| 1 | 10 (Mem 1) | LA_1 | PA1_1 |
| 1 | 8 (Mem 1) | LA_2 | PA1_3 |
| 1 | 7 (Mem 1) | LA_3 | PA1_4 |
| 1 | 6 (Mem 2) | LA_4 | PA2_1 |
| 1 | 5 (Mem 2) | LA_5 | PA2_2 |
| 1 | ... | | |
| 1 | 4 (Mem 2) | LA_6 | PA2_4 |
| 1 | 3 (Mem 3) | LA_7 | PA3_1 |
| 1 | 1 (Mem 3) | LA_8 | PA3_2 |

ADDRESS MAP TABLE (BEFORE UPDATE)

↑ Write DATA (LA_4, Access Score=8)

| Valid Bit | Access Score | LA | PA |
|---|---|---|---|
| 1 | 10 (Mem 1) | LA_1 | PA1_1 |
| 1 | 8 (Mem 1) | LA_2 | PA1_3 |
| 0 | 7 (Mem 1) | LA_3 | PA1_4 |
| 0 | 6 (Mem 2) | LA_4 | PA2_1 |
| 1 | 5 (Mem 2) | LA_5 | PA2_2 |
| 1 | ... | | |
| 1 | 4 (Mem 2) | LA_6 | PA2_4 |
| 1 | 3 (Mem 3) | LA_7 | PA3_1 |
| 1 | 1 (Mem 3) | LA_8 | PA3_2 |

ADDRESS MAP TABLE (CHECK SUBSTITUTION DATA)

| Valid Bit | Access Score | LA | PA |
|---|---|---|---|
| 1 | 10 (Mem 1) | LA_1 | PA1_1 |
| 1 | 8 (Mem 1) | LA_2 | PA1_3 |
| 1 | 8 (Mem 1) | LA_4 | PA1_4 |
| 1 | 7 (Mem 2) | LA_3 | PA2_1 |
| 1 | 5 (Mem 2) | LA_5 | PA2_2 |
| 1 | ... | | |
| 1 | 4 (Mem 2) | LA_6 | PA2_4 |
| 1 | 3 (Mem 3) | LA_7 | PA3_1 |
| 1 | 1 (Mem 3) | LA_8 | PA3_2 |

ADDRESS MAP TABLE (AFTER UPDATE)

FIG. 4B

ADDRESS MAP TABLE (BEFORE UPDATE)

| Valid Bit | Access Score | LA | PA |
|---|---|---|---|
| 1 | 10 (Mem 1) | LA_1 | PA1_1 |
| 1 | 8 (Mem 1) | LA_2 | PA1_3 |
| 1 | 7 (Mem 1) | LA_3 | PA1_4 |
| 1 | 6 (Mem 2) | LA_4 | PA2_1 |
| 1 | 5 (Mem 2) | LA_5 | PA2_2 |
| 1 | ... | | |
| 1 | 4 (Mem 2) | LA_6 | PA2_4 |
| 1 | 3 (Mem 3) | LA_7 | PA3_1 |
| 1 | 1 (Mem 3) | LA_8 | PA3_2 |

↑ Read DATA (LA_5, Access Score=8)

ADDRESS MAP TABLE (CHECK SUBSTITUTION DATA)

| Valid Bit | Access Score | LA | PA |
|---|---|---|---|
| 1 | 10 (Mem 1) | LA_1 | PA1_1 |
| 1 | 8 (Mem 1) | LA_2 | PA1_3 |
| 0 | 7 (Mem 1) | LA_3 | PA1_4 |
| 1 | 6 (Mem 2) | LA_4 | PA2_1 |
| 0 | 5 (Mem 2) | LA_5 | PA2_2 |
| 1 | ... | | |
| 1 | 4 (Mem 2) | LA_6 | PA2_4 |
| 1 | 3 (Mem 3) | LA_7 | PA3_1 |
| 1 | 1 (Mem 3) | LA_8 | PA3_2 |

ADDRESS MAP TABLE (AFTER UPDATE)

| Valid Bit | Access Score | LA | PA |
|---|---|---|---|
| 1 | 10 (Mem 1) | LA_1 | PA1_1 |
| 1 | 8 (Mem 1) | LA_2 | PA1_3 |
| 1 | 8 (Mem 1) | LA_5 | PA1_4 |
| 1 | 6 (Mem 2) | LA_4 | PA2_1 |
| 1 | 7 (Mem 2) | LA_3 | PA2_2 |
| 1 | ... | | |
| 1 | 4 (Mem 2) | LA_6 | PA2_4 |
| 1 | 3 (Mem 3) | LA_7 | PA3_1 |
| 1 | 1 (Mem 3) | LA_8 | PA3_2 |

MEMORY SYSTEM INCLUDING MEMORY DEVICE AND OPERATION METHOD THEREOF

CROSS-REFERENCE TO RELATED APPLICATION

The present application claims priority under 35 U.S.C. § 119(a) to Korean Patent Application No. 10-2016-0031970, filed on Mar. 17, 2016, which is incorporated herein by reference in its entirety.

BACKGROUND

1. Field

Exemplary embodiments of the present invention relate generally to a memory system including a plurality of memory devices and, more particularly, to a memory system for managing data stored in a plurality of memory devices.

2. Description of the Related Art

The computer environment paradigm is changing to ubiquitous computing in which a computer system can be used anywhere and at any time. Accordingly, use of portable electronic devices, such as mobile phones, digital cameras, and notebook computers, is increasing rapidly. In general, such portable electronic devices use a memory system (i.e., a data storage device) using a memory device. The data storage device is used as a main memory or an auxiliary memory of a portable electronic device.

A memory device for a memory system may be a volatile or a nonvolatile memory device. Examples of volatile memory devices include a dynamic random access memory (DRAM) and a static RAM (SRAM). Examples of nonvolatile memory devices include a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magnetoresistive RAM (MRAM), a resistive RAM (RRAM), and a flash memory.

Memory devices may be packaged and used in a memory system to increase the capacity and operating speed for the memory system. For example, several memory devices included in a personal computer (PC) are packaged in the form of a module in which the memory devices are integrated into a printed circuit board (PCB) and are mounted on the PC through slots. An example of such a module that is used widely is a dual in-line memory module (DIMM). In a computing platform, a DIMM may be used as a main memory and may include a plurality of DRAMs mounted in a parallel configuration. In the case of a DIMM which includes a plurality of DRAMs, data is stored regardless of the type and/or pattern of the data. As a result, memory access performance within the DIMM may be deteriorated because access speed is the same for all the data regardless of their type and/or pattern which may affect the access frequency of data.

SUMMARY

Various embodiments are directed to a method for managing data stored in a plurality of memory devices according to the type and/or pattern of data and a memory system suitable for performing said method.

In an embodiment, a memory system may include: first and second memory devices having at least one different characteristic from each other; and a controller suitable for configuring an address map of data stored in the first and the second memory devices, checking access frequency of the stored data, and updating the address map based on a result of the checking.

In another embodiment, an operating method of a memory system may include: storing data in first and second memory devices having at least one different characteristic from each other; configuring an address map of the data stored in the first and the second memory devices; checking access frequency of the data; and updating the address map based on a result of the checking.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which:

FIGS. 4A and 4B are diagrams showing examples of an address map table of the controller of FIG. 3.

DETAILED DESCRIPTION

Figure 1:
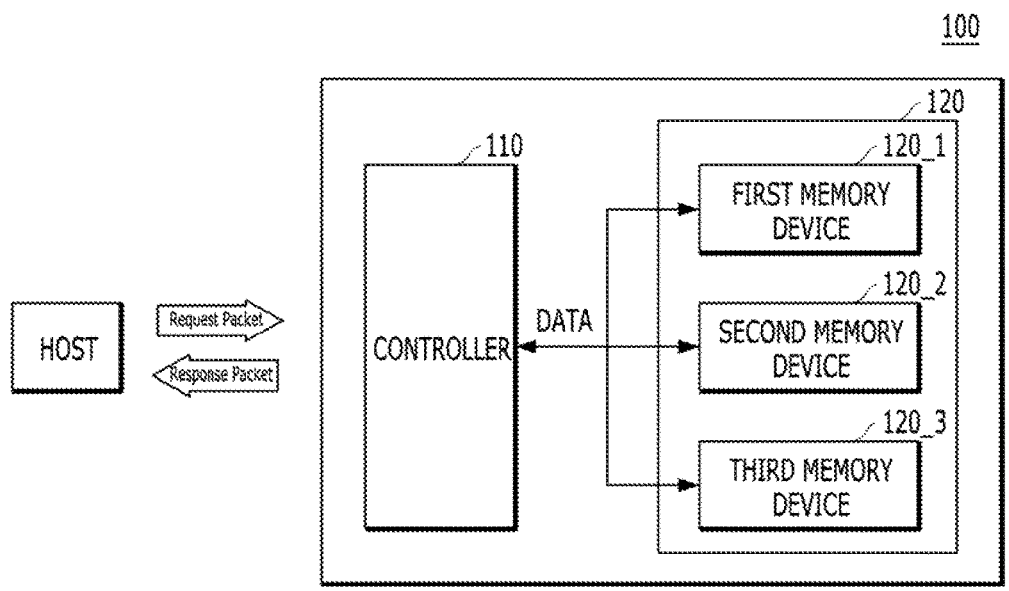
FIG. 1 is a block diagram showing a memory system comprising a controller and a plurality of memory devices, according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

The present invention may be implemented with diverse modifications and embodiments, and herein, some of the embodiments are taken as examples to describe the present invention. However, it is obvious to those skilled in the art that the described embodiments do not limit the scope of the present invention. Also, constituent elements of the described embodiments of the present invention should be understood to include all modifications, substitutes and equivalents thereof.

It will be further understood that, although the terms "first", "second", "third", and so on may be used herein to describe various elements, these elements are not limited by these terms. These terms are simply used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the various embodiments of the present invention will be described in detail with reference to the attached drawings.

FIG. 1 provides a memory system 100 according to an embodiment of the present invention. Referring to FIG. 1, the memory system 100 includes a controller 110 and a plurality of memory devices 120. For example, the memory devices 120 may include first to third memory devices 102_1 to 102_3.

The memory system 110 operates in response to a request from a host HOST. For example, the controller 110 of the memory system 100 stores data DATA, accessed by the host HOST, in the memory devices 120 and manages the stored data. The memory system 100 may exchange the data DATA with the host HOST based on various protocols. According to an embodiment of the present invention, a data exchange may be performed based on a packet. A detailed operation based on a packet data exchange between the memory system 100 and the host HOST is described later with reference to FIG. 2.

The controller 110 of the memory system 100 may store the data DATA, transmitted by the host HOST, in the memory devices 120 by allocating the data to at least one of the memory devices 120. In some embodiments, the controller 110 may map the data to at least one of the memory devices 120, and may manage and update an address map of the mapped data depending on data characteristics. That is, the controller 110 configures the address map of the data DATA when storing the data DATA in the memory devices 120 in response to a request from the host HOST. Furthermore, the controller 110 may change the storage location of corresponding data while updating an address map configured based on access frequency for the corresponding data of the host HOST.

The memory devices 120 include first to third memory devices 120_1, 120_2, and 120_3, but the present invention is not limited thereto. The memory devices 120 may include a different number of a plurality of memory devices. The memory devices 120 may be of different type and may have different performance. For example, the first memory device 120_1 may have a relatively high data rate and high data bandwidth, whereas the third memory device 120_3 may have a relatively low data rate and low data bandwidth, and the second memory device 120_2 may have an intermediate data rate and data bandwidth. The first memory device 120_1 may have a relatively low memory capacity, whereas the third memory device 120_3 may have a relatively high memory capacity and the second memory device 120_2 may have an intermediate memory capacity. In an embodiment, the first to the third memory devices 120_1, 120_2, and 120_3 are different types of memory devices selected form the group including a dynamic random access memory (DRAM), a phase change random access memory (PCRAM), and a flash memory (e.g., a NAND or a NOR flash memory).

In an embodiment, the first memory device 120_1 has a relatively high data rate and a relatively low memory capacity, whereas the third memory device 120_3 has a relatively low data rate and a high memory capacity. In such an embodiment, data frequently accessed by the host HOST (also referred to hereinafter as "hot data") is stored in the first memory device 120_1 for reducing the data access time or latency. In contrast, data occasionally accessed by the host HOST (also referred to hereinafter as "cold data") is stored in the third memory device 120_3 having a relatively low data rate, but having a high memory capacity, thereby being capable of increasing memory utilization.

In this case, the host HOST may score data based on access frequency of the data, may encode the scored data along with information about the data, and may send the encoded results. A detailed diagram showing an example of such a process is shown in FIG. 2.

Figure 2:
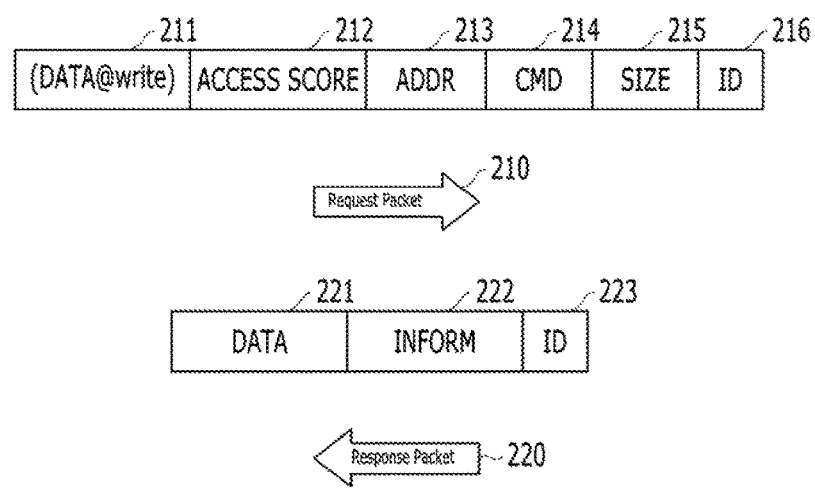
FIG. 2 is a diagram showing a data packet transmitted between a host and the memory system of FIG. 1.

Specifically, FIG. 2 illustrates a data packet transmission between the host HOST and the memory system 100 of FIG. 1.

The memory devices 120 of the memory system 100 may have different response latency for a request from the host HOST because they have different performance. Accordingly, data transmission between the host HOST and the memory system 100 may be performed based on a transaction identifier (ID) 216/223. Furthermore, the host HOST may set the access score of corresponding data by quantifying the access pattern of the corresponding data. The host HOST may check the access pattern of each of data stored in the memory system 100 through a training operation. The training operation of the host may be any suitable method among a plurality of well-known methods. Because such methods are well-known, a detailed description thereof is omitted.

When requesting data read/write from the memory system 100, the host HOST may encode an access score ACCESS SCORE 212 set on corresponding data along with a command CMD 214, an address ADDR 213, and a size value SIZE 215 of the data (along with data DATA@write 211 when a write request is made), and may transmit the encoded data as a request packet 210. The access score 212 may indicate how frequently the data is accessed. For example, a first access score may be set for hot data, and a second access score may be set for intermediate frequency data, and a third access score may be set for cold data. The first access score may be higher than the second access score, and the second access score may be higher than the third access score.

When a request packet 210 is received from the host HOST, the controller 110 of the memory system 100 may decode the request packet 210 and check the access score 212 which is encoded in the request packet 210. When a write operation is performed, the controller 110 may write corresponding write data in a memory device different from an existing memory device based on the access score 212. When a read operation is performed, the controller 110 may rewrite corresponding read data in a memory device different from an existing memory device based on the access score 212. Furthermore, when a read operation is performed, the controller 110 may encode read data 221 along with information 222 on the read data 221, and an ID 223 inputted by the host HOST and output the encoded data as a response packet 220.

Figure 3:
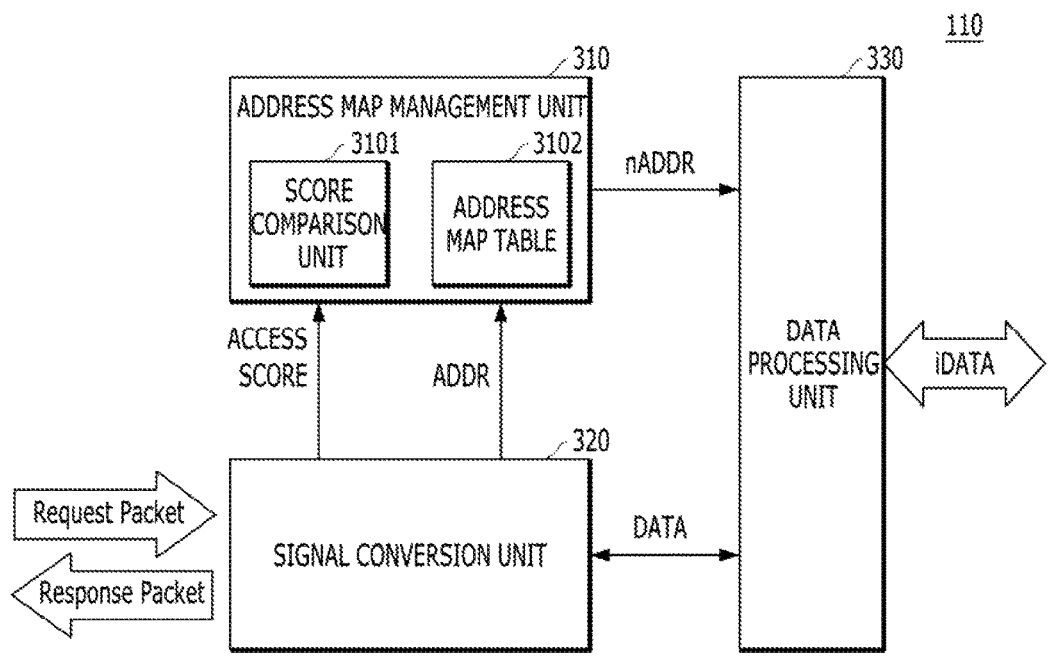
FIG. 3 is a block diagram showing a configuration example of the controller of FIG. 1.

Referring now to FIG. 3, the controller 110 may include an address map management unit 310, a signal conversion unit 320, and a data processing unit 330, according to an embodiment of the invention.

The signal conversion unit 320 may generate an access score ACCESS SCORE, an address ADDR, and data DATA, etc. by decoding a request packet transmitted by the host HOST. The signal conversion unit 320 may output the generated access score ACCESS SCORE and address ADDR to the address map management unit 310, and may output the generated data DATA to the data processing unit 330. The address map management unit 310 may generate an updated address nADDR in response to the access score ACCESS SCORE and the address ADDR. The data processing unit 330 may exchange internal data iDATA with a selected memory device from among the memory devices 120_1, 120_2, and 120_3 based on the updated address nADDR and the data DATA.

When a write operation is performed, the data processing unit 330 may arrange data DATA depending on the type of selected memory device and output the arranged internal data iDATA to the selected memory device. To this end, the data processing unit 330 may include an arrangement/delay circuit (not shown) corresponding to each of the memory devices 120_1, 120_2, and 120_3. For example, if the memory device includes a DRAM or PCRAM, the data processing unit 330 may include an arrangement/delay circuit which may be a first-ready, first-come-first-service (FRFCFS) type scheduler. If the memory device includes an NAND flash memory, the data processing unit 330 may include an arrangement/delay circuit may include a scheduler configured to perform a read/write operation for each page.

When a read operation is performed, the signal conversion unit 320 may encode data DATA received from the data processing unit 330 and output the encoded data as a response packet. To this end, the signal conversion unit 320 may include a packet generation unit (not shown). The signal conversion unit 320 may buffer an ID, and a command CMD, etc., received at a rea request from the host HOST, may encode them along with a response packet, and may output the encoded results.

The address map management unit 310 may include a score comparison unit 3101 and an address map table 3102. The address map management unit 310 may configure the address map table 3102 by assigning different momentum values to the first to the third memory devices 120_1, 120_2, and 120_3 based on at least one characteristic of each of the first to the third memory devices 120_1, 120_2, and 120_3. The characteristic may be, for example, a data rate, a data bandwidth, and/or a memory capacity. The score comparison unit 3101 may check the access frequency of corresponding data by the host HOST by comparing an access score ACCESS SCORE, output by the signal conversion unit 330, with the momentum value of a memory device in which the corresponding data has been stored. The address map management unit 310 may update the address map table 3102 if, as a result of the comparison of the score comparison unit 3101, the access score ACCESS SCORE of the corresponding data is found to be not identical to the momentum value of the memory device in which the corresponding data has been stored.

To this end, the address map management unit 310 detects substitution data and updates the addresses of the corresponding data and the substitution data. An address update operation may be performed whenever a change in the access score of data is detected according to continued write/read operations.

More specifically, when the address map management unit 310 updates the address map table 3102 through an address update operation, the data processing unit 330 may perform a read and a rewrite operation on data and substitution data having a changed relation. An operation of the controller 110 according to an embodiment of the present invention is described in more detail below with reference to FIGS. 4A and 4B.

FIGS. 4A and 4B are diagrams showing the address map table 3102 of FIG. 3.

First, if data on which an access score has not been set because a training operation has not been completed is received from the host HOST, the controller 110 may assign and store the data in a memory device having the highest data rate. For example, data may be first assigned to the first memory device 120_1 having the highest data rate and stored therein. Next, when there is no more storage space available in the first memory device 120_1, data may be sequentially assigned and stored to the second and the third memory devices 120_2 and 120_3 in the order of higher to lower data rates. The logical address (LA) of the data, which are managed by the host HOST, and a physical address (PA) indicative of the location at which the data has been stored are mapped and managed.

Furthermore, when an access score is set on each of the data from the host HOST, the data may be distributed to the memory devices 120 according to the data access frequency based on the access score. To this end, the address map management unit 310 may assign different momentum values (MV) to the memory devices 120 for ordering the memory devices 120 based on at least one characteristic of the memory devices 120. That is, the address map management unit 310 may determine a range of access scores corresponding to each memory device, e.g., to each of the first to third memory devices 120_1, 120_2, and 120_3 and set maximum and minimum cut-off scores as the momentum values. For example, when data rate is the selected characteristic for ranking the memory devices 120, the higher the data rate is for a memory device, the higher will also be a momentum value assigned by the address map management unit 310 for that memory device. Hence, for the memory devices 120_1, 120_2 and 120_3 of FIG. 1, the address map management unit 310 may assign the highest momentum value for the first memory device the 120_1 which has the highest data rate. Then, the address map management unit 310 may set a maximum cut-off score of, for example, 10 and a minimum cut off score of, for example, 7 for the first memory device 120_1 (i.e., Mem 1 in FIG. 4A), and may store data which have access scores within the set range in the first memory device 120_1. Likewise, the address map management unit 310 may set a maximum cut-off score of 6 and a minimum cut-off score of 4 for the second memory device 120_2 (i.e., Mem 2 in FIG. 4A), and may set a maximum cut-off score of 3 and a minimum cut-off score of 1 for the third memory device 120_3 (i.e., Mem 3 in FIG. 4A).

The state prior to the update of FIGS. 4A and 4B shows that data has been primarily distributed based on the access scores of the data and momentum values assigned to the memory devices 120. That is, from FIGS. 4A and 4B, it may be seen that data having access scores 7, 8, and 10 has been stored in the first memory device 120_1, data having access scores 4 to 6 has been stored in the second memory device 120_2, and data having access scores 1 and 3 has been stored in the third memory device 120_3.

In this case, a new access score may be checked by a write or read operation for stored data. If the checked access score does not correspond to the cut-off score range of a memory device in which the data has been stored, the address map table 3102 of the data may need to be updated. When the update is performed, a memory device having a cut-off score range corresponding to the checked access score may be confirmed, substitution data may be selected within the memory device, and the corresponding address map table 3102 may also be updated. FIGS. 4A and 4B show operations for updating the address map table 3102 according to respective write/read operations. First, an update operation according to a write operation is described below.

FIG. 4A shows an example in which a write operation for data corresponding to a logical address LA_4 has been requested in the state prior to an update. It may be seen that the corresponding data has been stored in the second memory device 120_2 (i.e., Mem 2 in FIG. 4A) prior to the update. The access score of the newly checked write data is 8, hence, it exceeds the cut-off score range (i.e., 4 to 6) of the second memory device 120_2. Accordingly, the write-requested data is assigned to the first memory device 120_1 which has a higher data rate than the second memory device 120_2. The score comparison unit 3101 may compare the access score of data stored in the first memory device 120_1 with the access score of the write-requested data. More specifically, the score comparison unit 3101 may compare the access score of data that belongs to the cut-off score range of the first memory device 120_1 and that corresponds to the minimum entry of the first memory device 120_1 with the access score of the write-requested data. As a result, the score comparison unit 3101 may select data, corresponding to the logical address (LA) LA_3, as substitution data because the selected data has an access score of 7 which is less than the access score of 8 of the newly received write data.

Accordingly, in order to exchange and store the write-requested data and the substitution data, the address map management unit 310 may output the addresses of the write-requested data and the substitution data as an update address nADDR. The data processing unit 330 may read the substitution data based on the update address nADDR, may exchange the locations of the write-requested data and the read substitution data, and may write and rewrite the write-requested data and the read substitution data. The address map management unit 310 may set the logical level of a corresponding valid bit (VB) to "0" until such a data exchange is terminated so that write and read for other packets requested by the host are not performed.

After the data exchange is completed, the address map management unit 310 may update the address map table 3102 according to the changed mapping relation. Referring to the state after the update of FIG. 4A, it may be seen that the logical addresses LA_3 and LA_4 are exchanged to be mapped to the physical address PA2_1 of the second memory device 120_2 and the physical address PA1_4 of the first memory device 120_1, respectively. If a distribution of the data access scores stored in the memory devices 120 is changed by a data exchange, the cut-off score of a corresponding memory device may also be differently set. That is, the minimum cut-off score of the first memory device 120_1 may be changed into 8, and the maximum cut-off score of the second memory device 120_2 may also be changed into 7 after the address map table update operation shown in FIG. 4A.

In contrast, if the access score of write-requested data is included in the cut-off score range of a corresponding memory device or a data exchange is not required as a result of a comparison between the access score of the write-requested data and the access score of data stored in another memory device, the address map management unit 310 does not update the address map table 3102, but may output a physical address (PA) corresponding to a received address ADDR as an update address nADDR without any change. The data processing unit 330 may store the write-requested data in an existing location based on the update address nADDR. An update operation of the address map table 3102 according to a read operation is described below.

FIG. 4B shows an example in which a read operation for data corresponding to a logical address LA_5 has been requested in the aforementioned initial state. It may be seen that in the state prior to an update, the corresponding data has been stored in the second memory device 120_2 (i.e., Mem 2 in FIG. 4A). Since the access score of the newly checked data is 8, it exceeds the cut-off score range (i.e., 4 to 6) of the second memory device 120_2. Accordingly, the read-requested data may be assigned to the first memory device 120_1 having a higher data rate than the second memory device 120_2. The score comparison unit 3101 may compare the access score of data stored in the first memory device 120_1 with the access score of the read-requested data. More specifically, the score comparison unit 3101 may compare the access score of data that belongs to the cut-off score range of the first memory device 120_1 and that corresponds to the minimum entry of the first memory device 120_1 with the access score of the read-requested data. As a result, the score comparison unit 3101 may select data, corresponding to the logical address LA_3, as substitution data because the selected data has an access score of 7 (i.e., 8>7).

Accordingly, in order to exchange and store the read-requested data and the substitution data, the address map management unit 310 may output the addresses of the read-requested data and the substitution data as an update address nADDR. The data processing unit 330 may read the read-requested data and the substitution data based on the update address nADDR, may exchange the locations of the read-requested data and the substitution data, and may rewrite the read-requested data and the substitution data. Furthermore, the requested and read data may be transferred to the signal conversion unit 320 and then output to the host. The address map management unit 310 may set the logical level of a corresponding valid bit (VB) to "0" until such a data exchange is terminated so that write and read for other packets requested by the host are not performed.

After the data exchange is completed, the address map management unit 310 may update the address map table 3102 according to the changed mapping relation. Referring to the state after the update of FIG. 4B, it may be seen that the logical addresses LA_3 and LA_5 are exchanged to be mapped to the physical address PA2_2 of the second memory device 120_2 and the physical address PA1_4 of the first memory device 120_1, respectively. If a distribution of the data access scores stored in the memory devices 120 is changed by a data exchange, the cut-off score of a corresponding memory device may also be differently set. That is, the minimum cut-off score of the first memory device 120_1 may be changed into 8, and the maximum cut-off score of the second memory device 120_2 may also be changed into 7 after the address map table update operation shown in FIG. 4A

In contrast, if the access score of read-requested data is included in the cut-off score range of a corresponding memory device or a data exchange is not required as a result of a comparison between the access score of the read-requested data and the access score of data stored in another memory device, the address map management unit 310 does not update the address map table 3102, but may output a physical address corresponding to a received address ADDR as an update address nADDR without any change. The data processing unit 330 may read the read-requested data based on the update address nADDR without any change and output the read data to the signal conversion unit 320.

Figure 5:
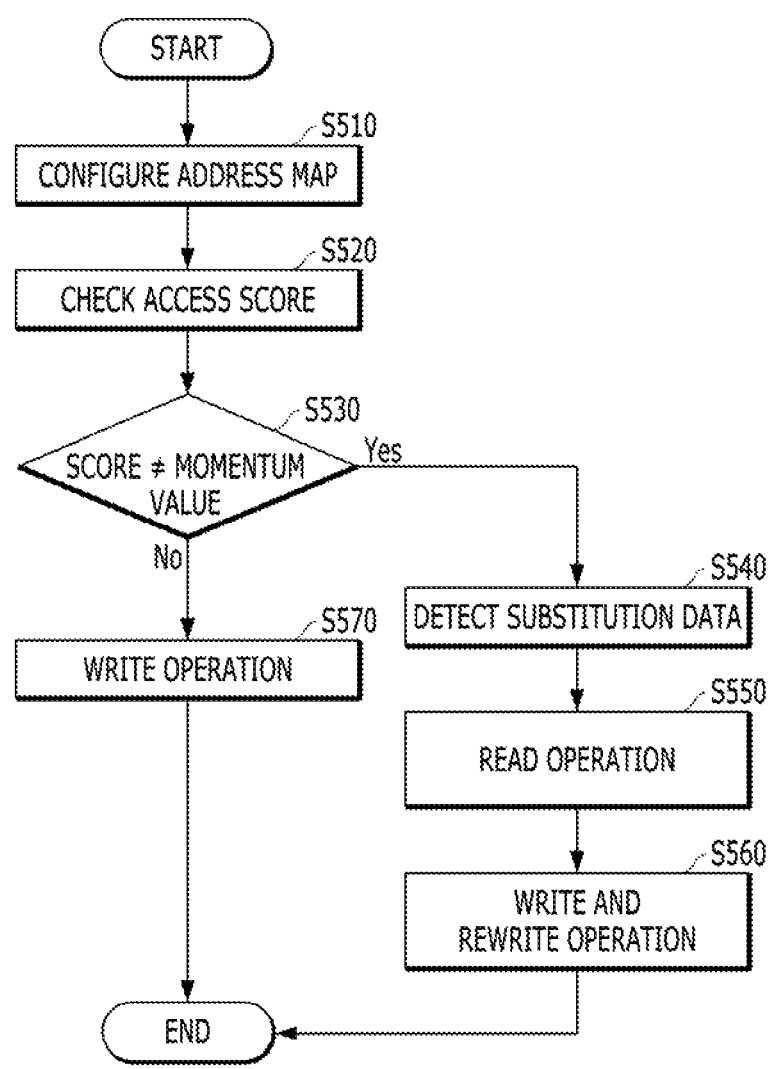
FIGS. 5 and 6 are flowcharts illustrating an overall operation of the memory system of FIG. 1, according to an embodiment of the present invention.
Figure 6:
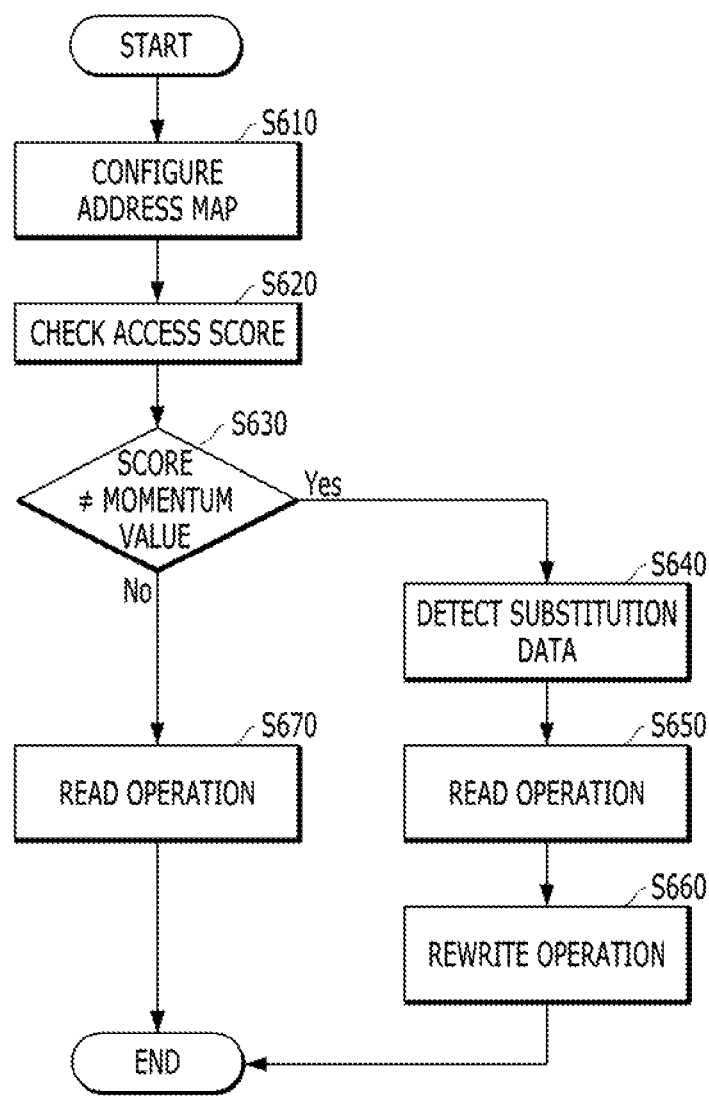

FIGS. 5 and 6 are flowcharts illustrating read and write operations of the memory system 100 of FIG. 1, respectively, according to embodiments of the present invention.

<Write Operation in FIG. 5>

1) Configure Address Map (S510)

The address map management unit 310 of the controller 110 may assign a different momentum value for each of the memory devices 120_1, 120_2, and 120_3 based on at least one characteristic (e.g., data rate, data bandwidth, and/or memory capacity) of each of the memory devices 120_1, 120_2, and 120_3. Each momentum value may be indicative of an access frequency range of data corresponding to each of the memory devices, and may include minimum and minimum cut-off values of access scores of the data. The address map table 3102 may be indicative of the relation between the address of data and the momentum value of a memory device in which the data has been stored.

2) Check and Compare Access Scores (S520/S530)

The access patterns of data stored in the memory devices 120_1, 120_2, and 120_3 may be quantified according to the training operation of the host. The controller 110 may check access frequency of the data stored in the memory devices 120_1, 120_2, and 120_3 based on the quantified numerical values (i.e., scores). The host may provide a quantified access score when making a write request for data. The controller 110 may check the access score provided along with the write request and compare the checked access score with a momentum value assigned to a corresponding memory device in which the data has been stored.

3) Detect Substitution Data (S540)

If, as a result of the comparison at step S530, the checked access score is found to be not identical to the assigned momentum value (S530, Yes), the controller 110 detects the substitution data of the data. In this case, the controller 110 confirms a memory device having a momentum value corresponding to the checked access score and detects the substitution data in the confirmed memory device. The substitution data may include data included in the entry of the confirmed memory device. The controller 110 may detect the substitution data by comparing the checked access score with the access score of the data included in the entry.

4) Read and Write/Rewrite Operation (S550/S560)

After the step S540, the controller 110 reads (S550) the detected substitution data, exchanges the addresses of the write-requested data and the substitution data, and writes and rewrites (S560) the write-requested data and the substitution data, respectively, based on the exchanged addresses. According to the write and rewrite operation, the momentum value assigned to the memory device may be adjusted.

5) Write Operation (S570)

If, as a result of the comparison at step S530, the checked access score is found to be identical to the assigned momentum value (S530, No), the controller 110 writes the write-requested data in an existing location without any change without updating the address map table.

<Read Operation in FIG. 6>

1) Configure Address Map (S610)

The address map management unit 310 of the controller 110 may assign different momentum values to the memory devices 120 based on the characteristic (e.g., data rate, data bandwidth, or memory capacity) of each of the memory devices 120. The momentum value is indicative of an access frequency range of data corresponding to each of the memory devices 120. The address map table 3102 may be indicative of the relation between the address of data and the momentum value of a memory device in which the data has been stored.

2) Check and Compare Access Scores (S620/S630)

The access patterns of data stored in the memory devices 120_1, 120_2, and 120_3 may be quantified according to the training operation of the host. The controller 110 may check access frequency of the data stored in the memory devices 120_1, 120_2, and 120_3 based on the quantified numerical values (i.e., scores). The host may provide a quantified access score when making a read request for data. The controller 110 may check the access score provided along with the read request and compare the checked access score with a momentum value assigned to a memory device in which the data has been stored.

3) Detect Substitution Data (S640)

If, as a result of the comparison at step S630, the checked access score is found to be not identical to the assigned momentum value (S630, Yes), the controller 110 detects the substitution data of the data. In this case, the controller 110 confirms a memory device having a momentum value corresponding to the checked access score and detects the substitution data in the confirmed memory device. The substitution data may include data included in the entry of the confirmed memory device. The controller 110 may detect the substitution data by comparing the checked access score with the access score of the data included in the entry.

4) Read and Rewrite Operation (S650/S660)

After the step S640, the controller 110 reads (S650) the read-requested data and the detected substitution data, exchanges the addresses of the read-requested data and the detected substitution data, and rewrites (S660) the read-requested data and the detected substitution data based on the exchanged addresses. According to the rewrite operation, the momentum value assigned to the memory device may be adjusted.

5) Read Operation (S670)

If, as a result of the comparison at step S630, the checked access score is found to be identical to the assigned momentum value (S630, No), the controller 110 reads the read-requested data without any change without updating the address map table and outputs the read data.

As described above, in the memory system according to an embodiment of the present invention, the time taken to access data can be reduced because data stored in a plurality of memory devices is divided according to access patterns and managed. Furthermore, use efficiency of memory devices can be improved because the memory system autonomously divides and stores data by taking into consideration the bandwidths of the memory devices.

According to the memory system according to the embodiments, the time taken to access data can be reduced and the utilization of a data storage space can be improved because data stored in memory devices is managed based on the access patterns of the data or the bandwidths of the memory devices.

Although various embodiments have been described for illustrative purposes, it will be apparent to those skilled in the art that various changes and modifications may be made without departing from the spirit and scope of the invention as defined in the following claims.

What is claimed is:

1. A memory system, comprising:
   first and second memory devices having at least one different characteristic and assigned to different momentum values from each other; and
   a controller suitable for configuring an address map of data stored in the first and the second memory devices, checking access frequency of the stored data, and updating the address map by detecting substitution data and exchanging the stored data and the substitution data between the first and second memory devices when a change in a checked access score of the stored data is detected based on a result of the checking,
   wherein the controller detects the substitution data by checking a memory device having a momentum value corresponding to the checked access score of the stored data having the change detected, among the first and second memory devices, and comparing the checked access score of the stored data having the change detected and access frequency of data stored in the checked memory device.

2. The memory system of claim 1, wherein the controller is suitable for configuring the address map by assigning the different momentum values to the first and the second memory devices based on at least one of a data rate, data bandwidth, or memory capacity of each of the first and the second memory devices.

3. The memory system of claim 2, wherein the controller is suitable for receiving information obtained by quantifying the access frequency of the data from a host when a write or read request for the data is made.

4. The memory system of claim 3, wherein the controller comprises:
   a signal conversion unit configured to receive a write or read request packet for the data from the host and generate the data, and quantification information and address of the data by converting the write or read request packet;
   an address map management unit configured to generate an update address in response to the quantification information and address of the data; and
   a data processing unit configured to exchange internal data with the first and the second memory devices based on the update address and the data.

5. The memory system of claim 4, wherein the address map management unit is configured to:
   compare the quantification information of the data with a momentum value of a memory device in which the data has been stored,
   detect the substitution data if, as a result of the comparison, the quantification information is not identical to the momentum value, and
   update the address map of the data and the substitution data.

6. The memory system of claim 5, wherein when the write request for the data is made, if the address map management unit updates the address map of the data and the substitution data, the data processing unit is configured to read the substitution data and to write and rewrite the data and the substitution data based on the updated address map.

7. The memory system of claim 5, wherein when the read request for the data is made, if the address map management unit updates the address map of the data and the substitution data, the data processing unit is configured to read the data and the substitution data and rewrite the read data and substitution data based on the updated address map.

8. The memory system of claim 1, wherein the first and the second memory devices comprise a plurality of memory devices suitable for being mounted on a dual in-line memory module (DIMM) and for having different data rates, data bandwidths, or capacities of memory.

9. The memory system of claim 1, wherein the controller is suitable for performing communication with a host based on a packet comprising information obtained by quantifying the access frequency of the data, and an identifier (ID), address, and command of the data.

10. An operating method of a memory system, comprising:
    storing data in first and second memory devices having at least one different characteristic and assigned to different momentum values from each other;
    configuring an address map of the data stored in the first and the second memory devices;
    checking access frequency of the data; and
    updating the address map by detecting substitution data and exchanging the stored data and the substitution data between the first and second memory devices when a change in a checked access score of the stored data is detected based on a result of the checking,
    wherein the substitution data is detected by checking a memory device having a momentum value corresponding to the checked access score of the stored data having the change detected, among the first and second memory devices, and comparing the checked access score of stored data having the change detected and access frequency of data stored in the checked memory device.

11. The operating method of claim 10, wherein the configuring of the address map of the data stored in the first and the second memory devices comprises assigning the different momentum values to the first and the second memory devices based on at least one of data rates, data bandwidths, or capacities of memory of the first and the second memory devices.

12. The operating method of claim 11, wherein the momentum value is indicative of an access frequency range of data corresponding to each of the first and the second memory devices.

13. The operating method of claim 12, wherein the checking of the access frequency of the data comprises:
    receiving information obtained by quantifying the access frequency when a write or read operation for the data is performed; and comparing the quantification information with a momentum value assigned to a memory device in which the data has been stored.

14. The operating method of claim 13, wherein the updating of the address map comprises, if the quantification information is not identical to the momentum value assigned to the memory device in which the data has been stored, updating the address map, based on a result of the checking:
confirming a memory device having a momentum value corresponding to the quantification information; and
detecting the substitution data in data stored in the confirmed memory device.

15. The operating method of claim 14, wherein the detecting of the substitution data comprises checking quantification information of data included in an entry of the confirmed memory device.

16. The operating method of claim 14, wherein when the write operation for the data is performed, the updating of the address map further comprises:
reading the substitution data;
exchanging addresses of the data and the substitution data, and writing and rewriting the data and the substitution data based on the exchanged addresses; and
adjusting the addresses of the data and the substitution data and the momentum values of the first and second memory devices in response to the writing and rewriting operations.

17. The operating method of claim 14, wherein when the read operation for the data is performed, the updating of the address map further comprises:
reading the data and the substitution data;
exchanging addresses of the read data and substitution data, and rewriting the read data and substitution data based on the exchanged addresses;
adjusting the addresses of the data and the substitution data and the momentum values of the first and the second memory devices in response to the rewriting operation; and
outputting the read data.

18. The operating method of claim 13, wherein:
the quantification information comprises a value scored according to the access frequency of the data, and
the quantification information has a higher score value as the access frequency of the data becomes higher.

19. The operating method of claim 18, wherein a momentum value corresponding to access frequency of a relatively high range is assigned to the first memory device if the first memory device has a relatively higher data rate, relatively higher data bandwidth, or relatively lower memory capacity than the second memory device.

20. The operating method of claim 19,
wherein the memory system further includes a third memory device suitable for having a relatively lower data rate, relatively lower data bandwidth, or relatively higher memory capacity than the second memory device,
wherein the first to the third memory devices comprise one of a dynamic random access memory (DRAM), a phase change random access memory (PCRAM), and a flash memory mounted on a dual in-line memory module (DIMM), respectively.

* * * * *